(12) United States Patent
Iwata

(10) Patent No.: US 8,165,488 B2
(45) Date of Patent: Apr. 24, 2012

(54) OUTPUT CONTROL DEVICE, IMAGE FORMING APPARATUS, AND OUTPUT CONTROL METHOD

(75) Inventor: Atsuki Iwata, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 378 days.

(21) Appl. No.: 12/471,915

(22) Filed: May 26, 2009

(65) Prior Publication Data

US 2009/0290894 A1    Nov. 26, 2009

(30) Foreign Application Priority Data

May 26, 2008  (JP) .................................. 2008-136741
May 25, 2009  (JP) .................................. 2009-125137

(51) Int. Cl.
*G03G 15/00* (2006.01)
(52) U.S. Cl. .......................................... 399/88; 399/67
(58) Field of Classification Search .................. 399/33, 399/38, 44, 67–70, 75, 88; 219/216, 619
See application file for complete search history.

(56) References Cited

U.S. PATENT DOCUMENTS

| | | | | |
|---|---|---|---|---|
| 7,283,763 | B2 * | 10/2007 | Akizuki et al. | 399/69 |
| 7,460,801 | B2 * | 12/2008 | Nishiyama | 399/44 |
| 7,565,087 | B2 * | 7/2009 | Matsusaka et al. | 399/69 |
| 2006/0214512 | A1 | 9/2006 | Iwata | |
| 2007/0284357 | A1 | 12/2007 | Takahashi et al. | |
| 2008/0061634 | A1 | 3/2008 | Iwata et al. | |
| 2009/0073213 | A1 | 3/2009 | Iwata | |

FOREIGN PATENT DOCUMENTS

| | | |
|---|---|---|
| JP | 7-203672 | 8/1995 |
| JP | 7-284832 | 10/1995 |

* cited by examiner

*Primary Examiner* — Hoan Tran
(74) *Attorney, Agent, or Firm* — Oblon, Spivak, McClelland, Maier & Neustadt, L.L.P.

(57) ABSTRACT

A storage unit stores therein a first correction amount and a second correction amount for correcting a first output amount of a first device. A correcting unit corrects, when the first output amount is smaller than a first target value, the first output amount based on a second output amount of a second device that is operated by the first output amount, a second target value of the second output amount, and the first correction amount, and otherwise, the first output amount based on the second correction amount. A control unit controls the first device to output the first output amount that is corrected by the correcting unit.

19 Claims, 8 Drawing Sheets

BACKGROUND ART

OUTPUT CONTROL DEVICE, IMAGE FORMING APPARATUS, AND OUTPUT CONTROL METHOD

CROSS-REFERENCE TO RELATED APPLICATIONS

The present application claims priority to and incorporates by reference the entire contents of Japanese priority document 2008-136741 filed in Japan on May 26, 2008 and Japanese priority document 2009-125137 filed in Japan on May 25, 2009.

BACKGROUND OF THE INVENTION

1. Field of the Invention

The present invention relates to a technology for controlling an output of an output device by a feedback control.

2. Description of the Related Art

To maintain a constant electric power that is output from a power supply device or a motor driving device, the electric power is controlled based on feedback data that is obtained by calculating a duty cycle of, for example, a pulse-width modulation (PWM) signal, and then calculating a difference between the calculated duty cycle and a reference duty cycle.

As a technology to implement an appropriate feedback control, for example, Japanese Patent Application Laid-open No. H7-203672 discloses a PWM control in which a first case where a voltage output from the electric power of the power supply device is larger than a target value is differentiated from a second case where the voltage is smaller than the target value to maintain the constant electric power output from the power supply device.

However, in the PWM control disclosed in Japanese Patent Application Laid-open No. H7-203672, the same correction amount is used in both the first case and the second case. Therefore, as it is clear from the examples shown in FIGS. 8A and 8B with the target value of 50, different initial values of the PWM signals before the feedback control (41 in the example shown in FIG. 8A, and 49 in the example shown in FIG. 8B) disadvantageously result in different averages of the PWM signals after the feedback control. In other words, the output of the electric power changes depending on the initial value of the PWM signal.

SUMMARY OF THE INVENTION

It is an object of the present invention to at least partially solve the problems in the conventional technology.

According to one aspect of the present invention, there is provided an output control device including a storage unit that stores therein a first correction amount and a second correction amount for correcting a first output amount of a first device; a control unit that controls an output of the first device; and a correcting unit that corrects, when the first output amount is deviated from a first target value, the first output amount based on the first correction amount and the second correction amount. The control unit controls the output of the first device such that the first output amount that is corrected by the correcting unit is output.

Furthermore, according to another aspect of the present invention, there are provided an output control method and an output control program for the above-described output control device and an image forming apparatus including the output control device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

The following embodiments of the present invention are described on the assumption that an output control device is used in an image forming apparatus including an induction-heating (IH) fixing system. However, the output control device can be used in some other device.

Figure 1:
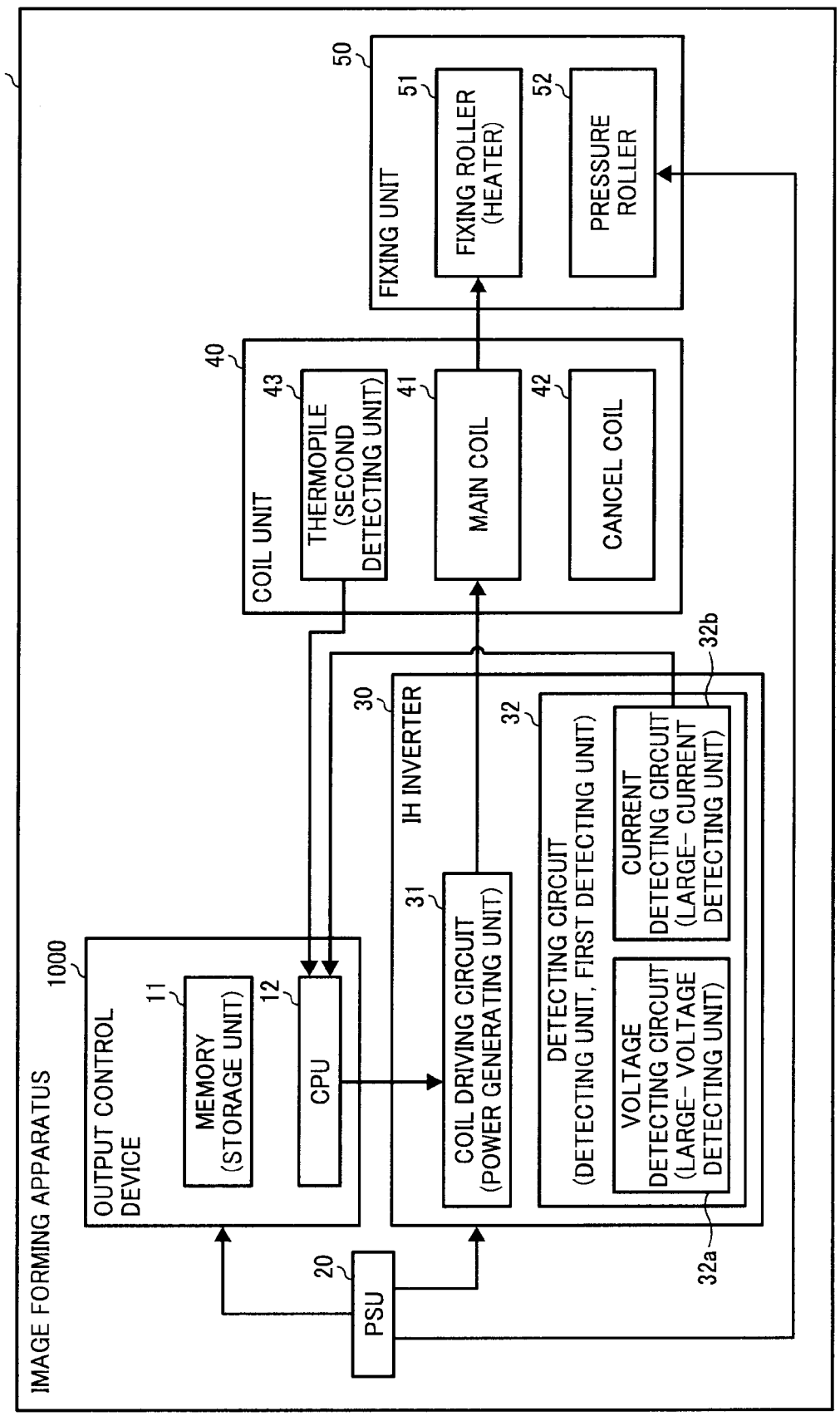
FIG. 1 is a block diagram of hardware configuration of an image forming apparatus according to a first embodiment of the present invention.

FIG. 1 is a block diagram of hardware configuration of an image forming apparatus 10 according to a first embodiment of the present invention. As shown in FIG. 1, the image forming apparatus 10 includes a power supply unit (PSU) 20, an IH inverter 30, a coil unit 40, a fixing unit 50, and an output control device 1000.

The PSU 20 supplies electric powers to various circuits of the image forming apparatus 10 based on an alternating-current (AC) power. More particularly, the PSU 20 receives the PC power, and converts the AC power into various direct-current (DC) powers, such as a +24-volt power and a +5-volt power, suitable for the individual circuits. The PSU 20 supplies the received AC power to the IH inverter 30 and a pressure heater (not shown) that heats a pressure roller 52 of the fixing unit 50 via a fixing relay (not shown).

The IH inverter 30 generates, according to a control signal received from the output control device 1000, an electric power to drive a main coil 41 of the coil unit 40. The IH inverter 30 includes a coil driving circuit 31 and a detecting circuit 32.

The coil driving circuit 31, which is a power generating unit, generates the electric power to drive the main coil 41. The coil driving circuit 31 corresponds to a first device; the generated electric power corresponds to a first output amount. More particularly, the coil driving circuit 31 generates a coil current from the AC power that is received from the PSU 20 according to the control signal that is received from the output control device 1000, and drives the main coil 41 by the coil current.

The detecting circuit 32 includes a voltage detecting circuit 32a and a current detecting circuit 32b. The voltage detecting circuit 32a detects a voltage of the electric power output from the coil driving circuit 31 (hereinafter, "output power"). The current detecting circuit 32b detects a current of the electric power output from the coil driving circuit 31 (i.e., the coil current). In the embodiments, the voltage and the current of the electric power output from the coil driving circuit 31 is detected by detecting the voltage and the current of the electric power input to the IH inverter 30.

The coil unit 40 includes various IH coils. More particularly, the coil unit 40 includes the main coil 41, a cancel coil 42, and a thermopile 43.

The main coil 41 is used to induce an eddy current, and heat a fixing roller 51 of the fixing unit 50 with an electromagnetic induction phenomenon. When the coil driving circuit 31 of the IH inverter 30 outputs the coil current to the main coil 41, the coil current in the main coil 41 induces a magnetic field around the main coil 41. The magnetic field induces the eddy current, which heats the fixing roller 51. The fixing roller 51 corresponds to a second device that operates by the electric power generated by the coil driving circuit 31 (i.e., the first output amount). The thermal energy produced by the fixing roller 51 corresponds to a second output amount.

The cancel coil 42 is used to induce a magnetic field in a proper direction to cancel the magnetic field around the main coil 41.

The thermopile 43 detects a temperature of the fixing roller 51. Some other temperature detecting device can be used instead of the thermopile, such as a thermistor.

The fixing unit 50 includes the fixing roller 51 and the pressure roller 52. The fixing unit 50 fixes a toner image onto a recording sheet with the heat by the fixing roller 51 and the pressure by the pressure roller 52. The fixing roller 51 heats the recording sheet on which the unfixed toner image is formed. The fixing roller 51 is heated by heat produced by the eddy current that is induced by the magnetic field around the main coil 41.

The pressure roller 52 receives a pressure having a predetermined value toward the fixing roller 51.

The output control device 1000 controls the electric power that is output from the IH inverter 30 to the coil unit 40. In the first embodiment, the output control device 1000 corrects the electric power that is output from the IH inverter 30 to a target value by using the feedback data about the electric power that is detected by the detecting circuit 32.

The output control device 1000 includes a memory 11 that stores therein information necessary for a control process; and a central processing unit (CPU) 12 that performs the control process. The configuration of the output control device 1000 is described below with reference to FIG. 2.

Figure 2:
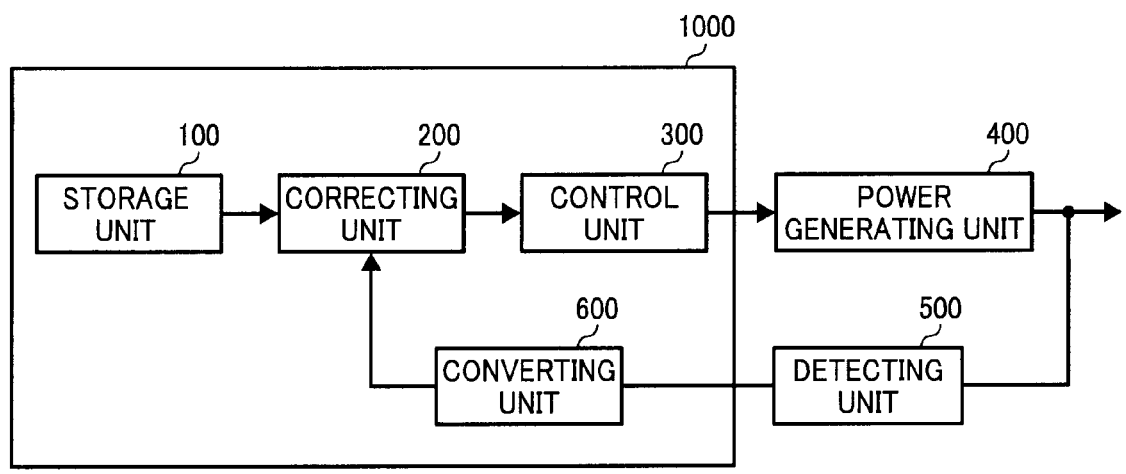
FIG. 2 is a block diagram of an output control device according to the first embodiment.

FIG. 2 is a block diagram of the output control device 1000 according to the first embodiment. The output control device 1000 includes a storage unit 100, a correcting unit 200, a control unit 300, and a converting unit 600. For example, the storage unit 100 corresponds to the memory 11 shown in FIG. 1. The correcting unit 200, the control unit 300, and the converting unit 600 correspond to functional sections implemented by the CPU 12 shown in FIG. 1. The output control device 1000 is connected to a power generating unit 400 and a detecting unit 500. The power generating unit 400 corresponds to the coil driving circuit 31 shown in FIG. 1, and the detecting unit 500 corresponds to the detecting circuit 32 shown in FIG. 1.

The following description is made on the assumption that the output control device 1000 is used in a multifunction product (MFP), i.e., the image forming apparatus 10. However, it is allowable to use the output control device 1000 in some other feedback-control device.

The storage unit 100 is a recording medium such as a memory. The storage unit 100 stores therein a target value (target power) of an electric power output from the power generating unit 400 (output power), a negative correction amount (an example of a first correction amount), and a positive correction amount (an example of a second correction amount) to adjust the output power. When a feedback signal that is obtained by converting a feedback voltage to a digital signal by the converting unit 600 is equal to or larger than the target power, the PWM duty cycle is decreased by the negative correction amount. When the feedback signal is smaller than the target power, the PWM duty cycle is increased by the positive correction amount.

The positive correction amount is set different from the negative correction amount (e.g., for the target power being 50 watts (W), the positive correction amount is 11%; and the negative correction amount is 10%) in such a manner that an average value of the electric power output from the power generating unit 400 (hereinafter, "average power") becomes constant. Examples of controlling the electric power on the assumption that the target power is about 50 W, the positive correction amount is 11%, and the negative correction is 10% are described in the first embodiment.

The correcting unit 200 compares the feedback signal, which is obtained by converting a voltage value by the converting unit 600, with the target power, which is stored in the storage unit 100, and determines whether the feedback signal is equal to or larger than the target power. If the feedback signal is equal to or larger than the target power, the correcting unit 200, for example, subtracts the negative correction amount stored in the storage unit 100 from the current duty cycle of the PWM signal, and sends a pulse signal indicative of a result of the subtraction to the control unit 300.

If the feedback signal is smaller than the target power, the correcting unit 200, for example, adds the positive correction amount stored in the storage unit 100 to the current duty cycle of the PWM signal, and sends the pulse signal indicative of a result of the addition to the control unit 300.

Figure 3A:
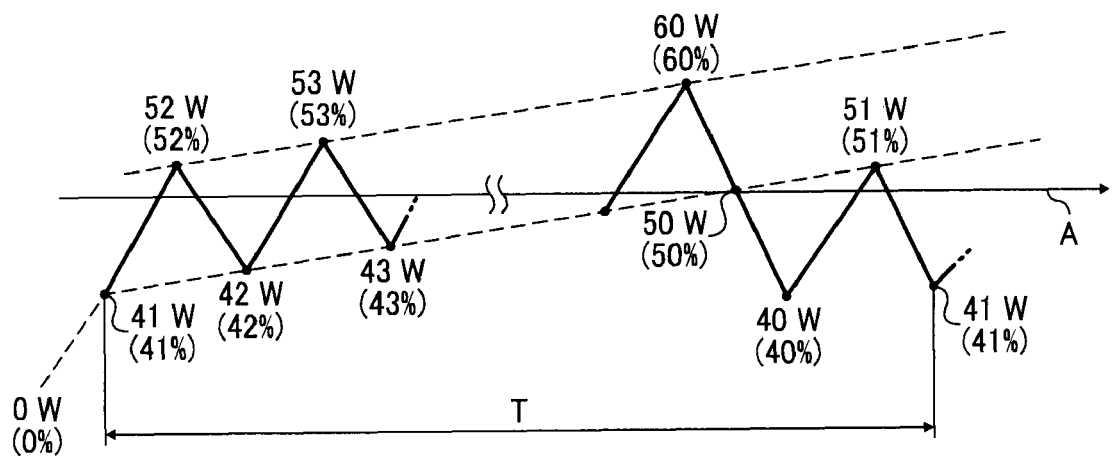
FIG. 3A is a schematic diagram for explaining feedback control according to the first embodiment where an initial value is 41 W and a positive correction amount is larger than a negative correction amount.

Suppose a first case with reference to FIG. 3A where a target power A is 50 W, the positive correction amount is 11%, the negative correction amount is 10%, the electric power output from the power generating unit 400 increases from 0 W to 41 W, i.e., near the target power A (i.e., 41 W is the initial value before the feedback control), and the converting unit 600 outputs the feedback signal corresponding to 41 W. The correcting unit 200 then reads the positive correction amount 11% from the storage unit 100, adds the positive correction amount 11% to the current duty cycle of the PWM signal enclosed in parentheses (i.e., 41%), and outputs the pulse signal indicative of the result of the addition, i.e., 52%. The output power after the correction is 52 W.

After that, in response to the feedback signal indicative of 52 W, the correcting unit 200 subtracts the negative correction amount 10% from the duty cycle 52% of the corrected PWM signal, and outputs the pulse signal 42% so that the control unit 300 decreases the output power lower than the target power A to 42 W.

Figure 3B:
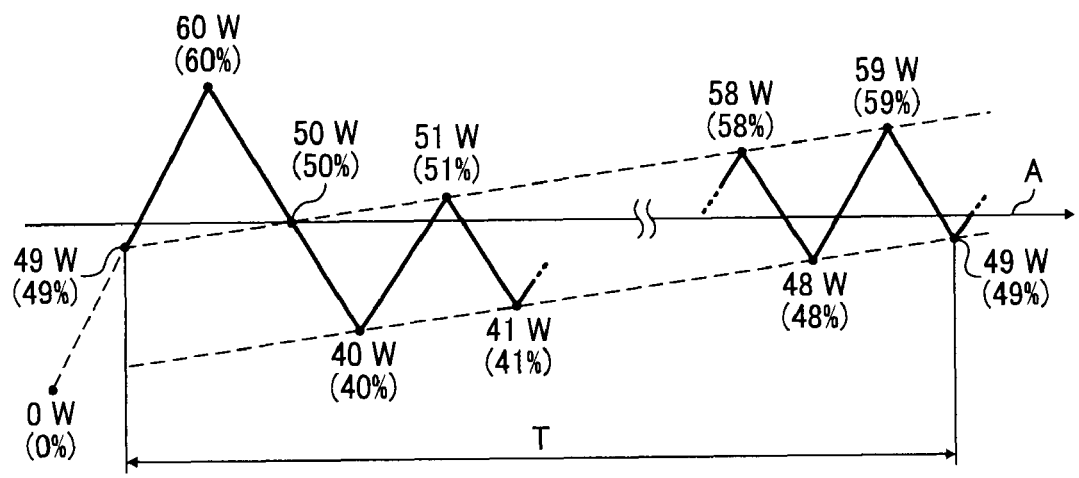
FIG. 3B is a schematic diagram for explaining the feedback control according to the first embodiment where the initial value is 49 W and the positive correction amount is larger than the negative correction amount.

FIG. 3B is a schematic diagram for explaining a second case where the target power A, the positive correction amount, and the negative correction amount are equal to those in the first case, but the initial value of the output power is 49 W different from that in the first case. In the second case as shown in FIG. 3B, because of the different initial value, the output power changes differently from the output power changes in the first case. However, an average of the values of the output power within a cycle T is equal to that in the first case. It is noted that the value of the output power at a right end of the cycle T is not used in the average calculation. In the first case shown in FIG. 3A, for example, the value 41 W of the output power at a left end of the cycle T is used in the average calculation, but the value 41 W of the output power at the right end of the cycle T is not used in the average calculation. In this manner, the correction using the positive correction amount and the negative correction amount alternately makes the average of the electric power output from the power generating unit 400 within the cycle T constant.

Figure 4A:
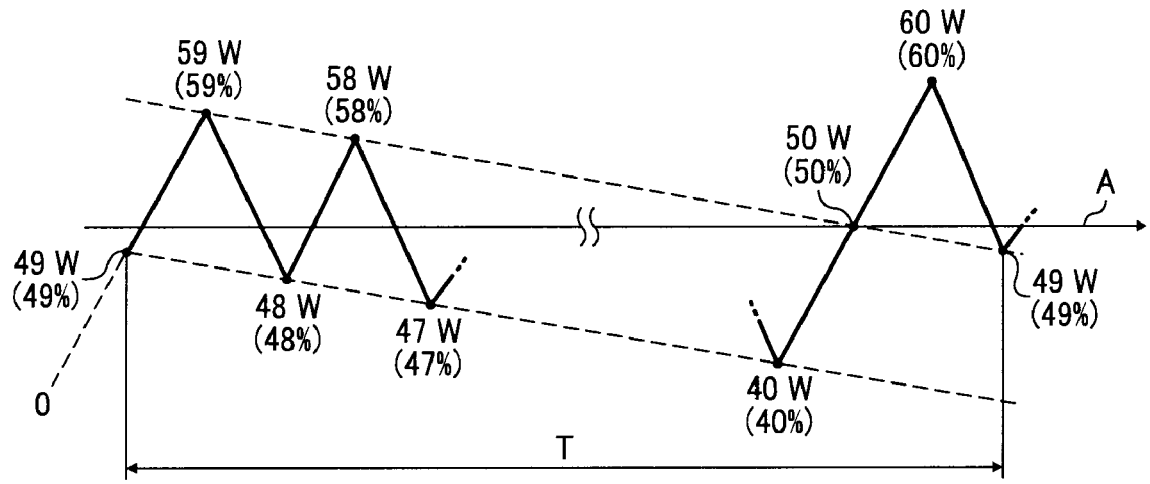
FIG. 4A is a schematic diagram for explaining the feedback control according to the first embodiment where the initial value is 49 W and the positive correction amount is smaller than the negative correction amount.
Figure 4B:
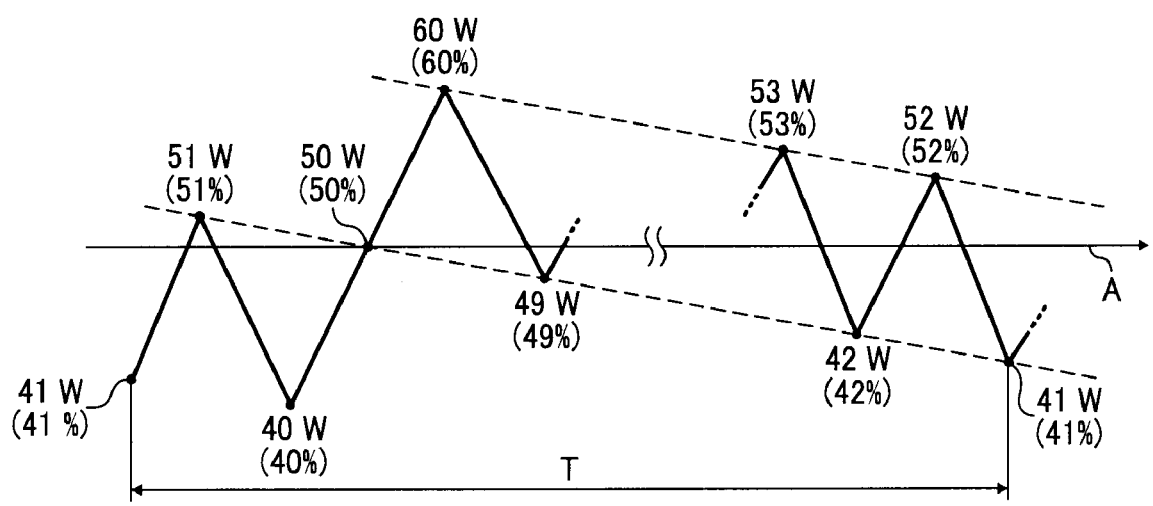
FIG. 4B is a schematic diagram for explaining the feedback control according to the first embodiment where the initial value is 41 W and the positive correction amount is smaller than the negative correction amount.

Although the positive correction amount is set larger than the negative correction amount in the above description, the positive correction amount can be set smaller than the negative correction amount as in a case shown in FIGS. 4A and 4B (e.g., the positive correction amount of 10% and the negative correction amount of 11%).

The control unit 300 includes a conversion circuit that converts the pulse signal that is received from the correcting unit 200 into the PWM signal. The control unit 300 sends the PWM signal to the power generating unit 400.

The power generating unit 400 generates the electric power corresponding to the duty cycle of the PWM signal received from the control unit 300.

The detecting unit 500 includes a conversion circuit that converts the electric power to the voltage. The detecting unit 500 detects the electric power generated by the power generating unit 400, converts the detected electric power to the voltage value, and sends the voltage value to the converting unit 600.

The converting unit 600 includes a converter such as an analog-to-digital (A/D) converter. The converting unit 600 converts the voltage value that is received from the detecting unit 500 into the feedback signal, and sends the feedback signal to the correcting unit 200.

A process performed by the output control device 1000 is described below.

Figure 5:
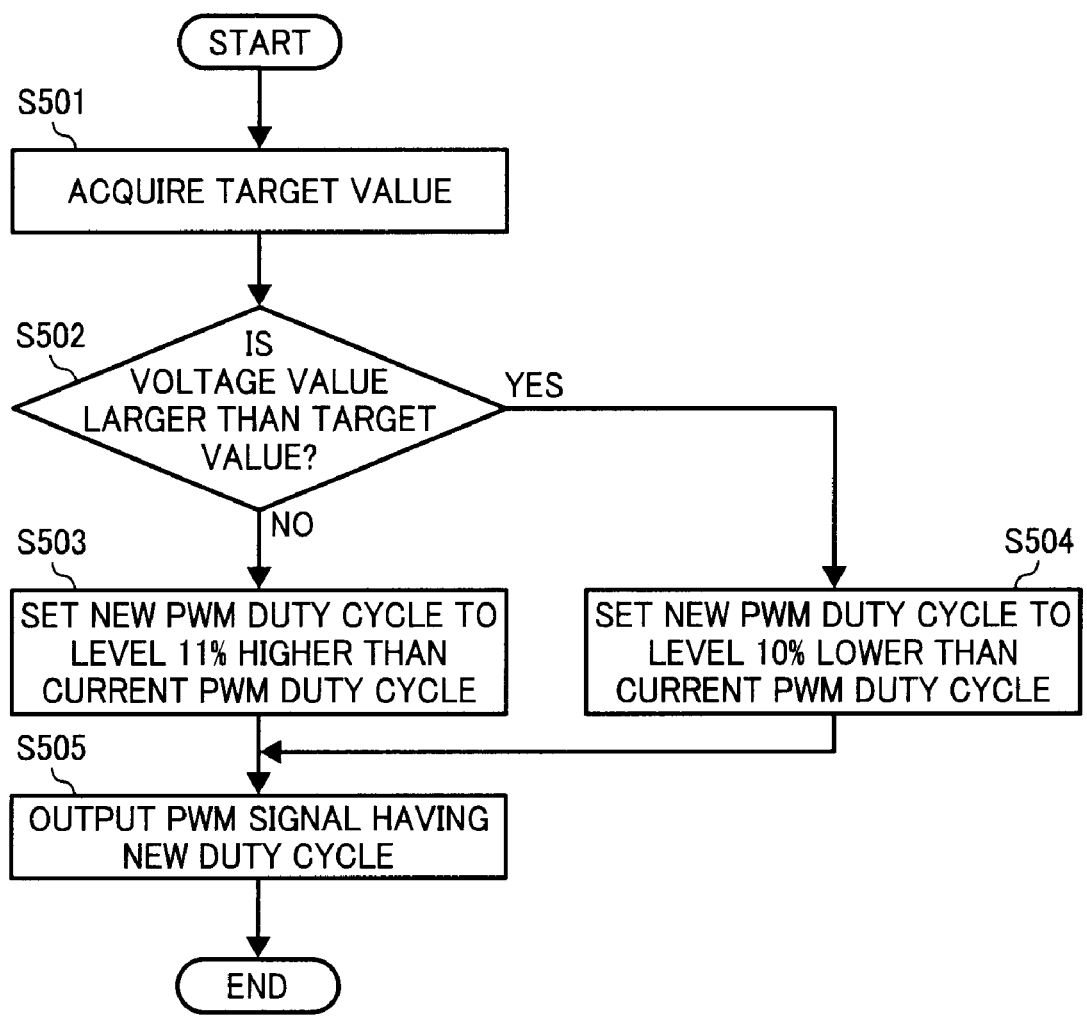
FIG. 5 is a flowchart of a feedback control process according to the first embodiment in which the output control device controls output of an electric power.

FIG. 5 is a flowchart of a feedback control process in which the output control device 1000 controls the constant output of the electric power. The feedback control process starts in response to an application execution instruction, such as a print instruction, that is received via a control panel (not shown) of the MFP. Suppose a situation that in the MFP including the output control device 1000 in a power-on state, the power generating unit 400 outputs the electric power near the target value (e.g., the electric power of 41 W that is equal to the initial value as shown in FIG. 4B), and the converting unit 600 converts the voltage value of the electric power into the feedback signal, and sends the feedback signal to the correcting unit 200.

As shown in FIG. 5, upon receiving the feedback signal from the converting unit 600, the correcting unit 200 acquires the target value from the storage unit 100 (Step S501). The correcting unit 200 compares the acquired target value with the voltage value indicated by the received feedback signal, and determines whether the voltage value is equal to or larger than the target value (Step S502).

If the voltage value is equal to or larger than the target value (Yes at Step S502), the correcting unit 200 subtracts the negative correction amount, which is stored in the storage unit 100, from the voltage value, and outputs a pulse signal that causes the control unit 300 to generate the PEWM signal having the duty cycle according to which the power generating unit 400 generates the electric power having the voltage smaller than the target power (Step S504).

If the voltage value is smaller than the target value (No at Step S502), the correcting unit 200 adds the positive correction amount, which is stored in the storage unit 100, to the voltage value indicated by the feedback signal, and outputs a pulse signal that causes the control unit 300 to generate the PWM signal having the duty cycle according to which the power generating unit 400 generates the electric power having the voltage equal to or larger than the target power (Step S503).

The control unit 300 converts the pulse signal that is received at Step S503 or Step S504 into the PWM signal, and sends the PWM signal to the power generating unit 400 (Step S505). After that, the power generating unit 400 generates the electric power according to the received PWM signal; the detecting unit 500 detects the output power, and converts the output power into the voltage value; the converting unit 600 converts the voltage value into the feedback signal, and sends the feedback signal to the correcting unit 200.

In this manner, in the feedback control process for controlling the electric power output from the power generating unit 400 to the target power, the feedback control is performed repeatedly in such a manner that if the output power is equal to or larger than the target power, the output power is decreased by the negative correction amount to the value smaller than the target power, and if the output power is smaller than the target power, the output power is increased by the positive correction amount, which is different from the negative correction amount, to the value equal to or larger than the target power. As a result, even if the initial value of the electric power output from the power generating unit 400 before the feedback control is variable, the average of the electric power output from the power generating unit 400 is fixed. Because the feedback control according to the first embodiment makes the electric power to vary in such a manner that the same patterns are repeated as shown in FIGS. 3A, 3B, 4A, and 4B, the average power per cycle is fixed to the target power, even if the initial value of the electric power is variable.

In the first embodiment, to maintain the constant average value of the electric power that is output from the power generating unit 400 of the output control device 1000, the different correction amounts are used in the feedback control in such a manner that either one of the correction amounts is selected according to a result of the determination whether the output power is larger than the target power. However, it an available range of the supply power is limited, the feedback control is required to be performed within the available range. Moreover, there are needs for more accurate feedback control taking it into consideration the output power and a temperature of a thermal energy caused by output of the electric power. To satisfy the needs, in a second embodiment of the present invention, the more accurate feedback control taking the electric power and the temperature into consideration is performed.

The hardware configuration of an output control device 2000 according to the second embodiment is different from the output control device 1000 according to the first embodiment, but the hardware configuration of an image forming apparatus according to the second embodiment is the same as the image forming apparatus 10 according to the first embodiment. Therefore, the description about the image forming apparatus is not repeated. The output control device 2000 is described with reference to FIG. 6.

Figure 6:
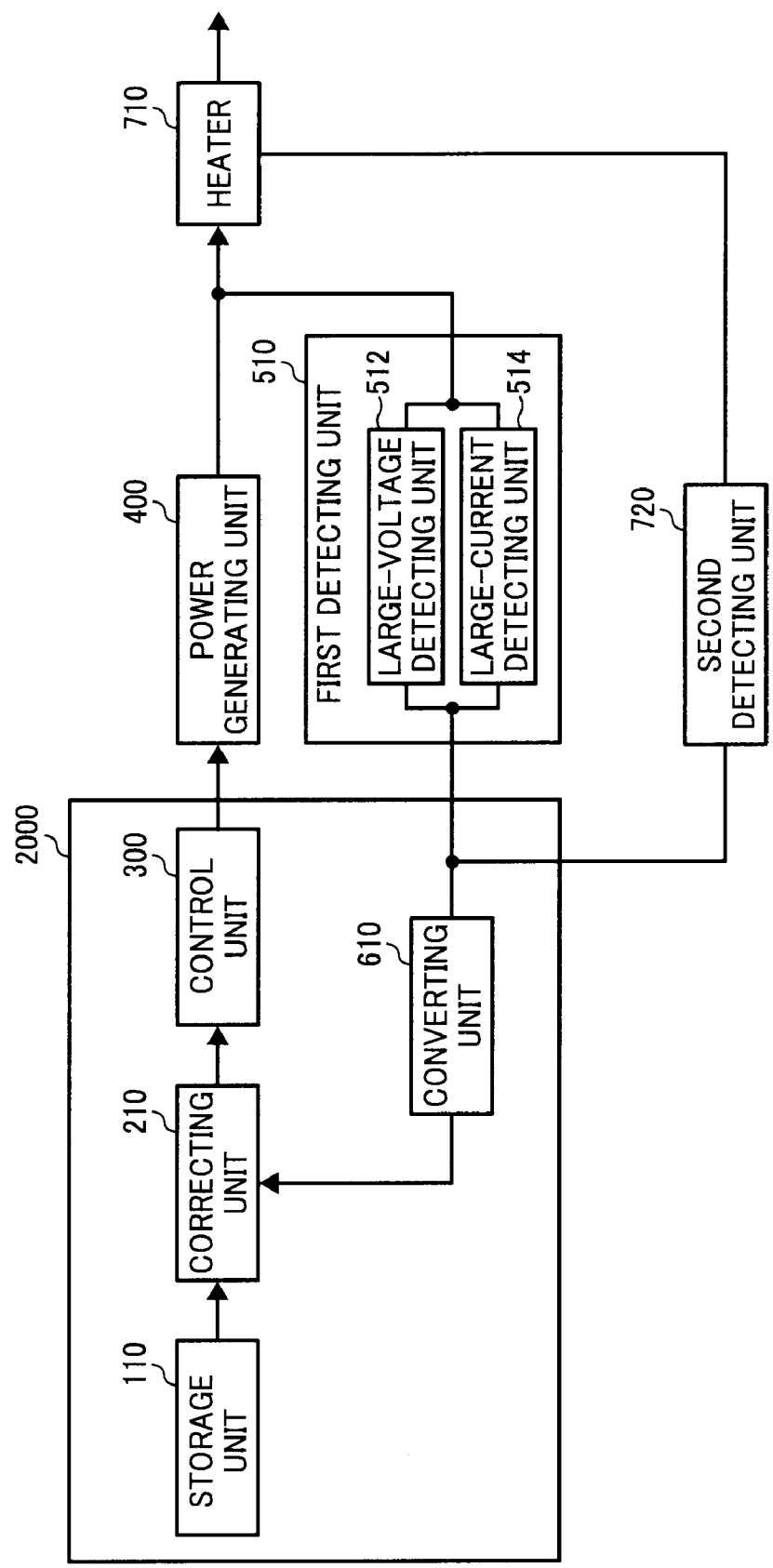
FIG. 6 is a block diagram of an output control device according to a second embodiment of the present invention.

FIG. 6 is a block diagram of the output control device 2000. The output control device 2000 has the configuration different from that of the output control device 1000 according to the first embodiment in that the output control device 2000 includes a storage unit 110 different from the storage unit 100, a correcting unit 210 different from the correcting unit 200, and a converting unit 610 different from the converting unit 600. The parts corresponding to those in the first embodiment are denoted with the same reference numerals, and the same description is not repeated.

The storage unit 110 corresponds to the memory 11 shown in FIG. 1. The correcting unit 210, the control unit 300, and the converting unit 610 correspond to functional sections implemented by the CPU 12 shown in FIG. 1. The output control device 2000 is connected to the power generating unit 400, a first detecting unit 510, a heater 710, and a second detecting unit 720. The power generating unit 400 corresponds to the coil driving circuit 31 shown in FIG. 1; the first detecting unit 510 corresponds to the detecting circuit 32; the heater 710 corresponds to the fixing roller 51; and the second detecting unit 720 corresponds to the thermopile 43.

The storage unit 110 stores therein data the same as that stored in the storage unit 100 according to the first embodiment. In addition, the storage unit 110 stores therein a target value of the temperature of the thermal energy that is output from the heater 710 (hereinafter, "target temperature"), and a proportionality coefficient and a differential coefficient that are used in a feedback control process of controlling the temperature of the thermal energy output from the heater 710 to the target temperature.

The storage unit 110 stores therein Equation (1) by which a new PWM duty cycle is calculated from feedback data about the output power and the temperature of the thermal energy that is output from the heater 710. More particularly, if the correcting unit 210 determines that the voltage value indicated by the feedback signal output from the converting unit 610 is smaller than the target value, the correcting unit 210 calculates the new PWM duty cycle by using Equation (1) from the target temperature, a temperature output from the heater 710 (i.e., the temperature that is detected when the determination about the current voltage value is made (hereinafter, "current temperature"), and a temperature that is detected when the determination about a previous voltage value immediately before the current voltage value is made (hereinafter, "previous temperature"):

$$PD_{new} = PD_{now} + T' \times K_p - (T_n - T_p) \times K_d \qquad (1)$$

where $PD_{new}$ is new PWM duty cycle to be calculated when the output power is determined to be smaller than the target value; $PD_{now}$ is current PWM duty cycle being output currently; T' is difference between the target temperature and the current temperature (target temperature-current temperature); $K_p$ is proportionality coefficient; $K_d$ is differential coefficient; $T_n$ is current temperature; and $T_p$ is previous temperature.

In the following description, it is assumed that the thermal energy output from the heater 710 is subjected to the feedback control by using the proportionality coefficient and the differential coefficient (so called "proportional derivative (PD) control"). However, it is allowable to use another feedback control, for example, using an integral coefficient instead of the differential coefficient (e.g., proportional integral (PI) control).

The correcting unit 210 performs the following process in addition to the same process performed by the correcting unit 200 according to the first embodiment. If the voltage value indicated by the feedback signal output from the converting unit 610 is smaller than the target value, the correcting unit 210 calculates the new PWM duty cycle using Equation (1) that is stored in the storage unit 110, and corrects the PWM duty cycle.

The correcting unit 210 determines whether the calculated voltage value is equal to or larger than a sum of the voltage value indicated by the feedback signal output from the converting unit 610 and the positive correction amount stored in the storage unit 110. If the calculated voltage value is smaller than the sum of the current PWM duty cycle and the positive correction amount stored in the storage unit 110, the correcting unit 200 outputs the pulse signal to be converted into the PWM signal having the duty cycle corresponding to the calculated voltage value.

If the calculated voltage value is equal to or larger than the sum of the current PWM duty cycle and the positive correction amount stored in the storage unit 110, the correcting unit 200 outputs the pulse signal to be converted into the PWM signal having the duty cycle corresponding to the sum of the current PWM duty cycle and the positive correction amount stored in the storage unit 110.

The first detecting unit 510 includes a large-voltage detecting unit 512 and a large-current detecting unit 514. The large-voltage detecting unit 512 corresponds to the voltage detecting circuit 32a; and the large-current detecting unit 514 corresponds to the current detecting circuit 32b.

The large-voltage detecting unit 512 converts a voltage of the electric power output from the power generating unit 400 (hereinafter, "large voltage") into a voltage for generating the feedback signal (hereinafter, "first small voltage").

The large-current detecting unit 514 converts a current of the electric power output from the power generating unit 400 (hereinafter, "large current") into a voltage for generating the feedback signal (hereinafter, "second small voltage").

The heater 710 receives the electric power from the power generating unit 400, converts the electric power to the thermal energy, and outputs the thermal energy to, for example, a fixing device.

The second detecting unit 720 converts the temperature produced by the thermal energy output from the heater 710 to a voltage for generating the feedback signal (hereinafter, "third small voltage"). The first small voltage, the second small voltage, and the third small voltage are input to the converting unit 610, and then the feedback signal is output from the converting unit 610.

Figure 7:
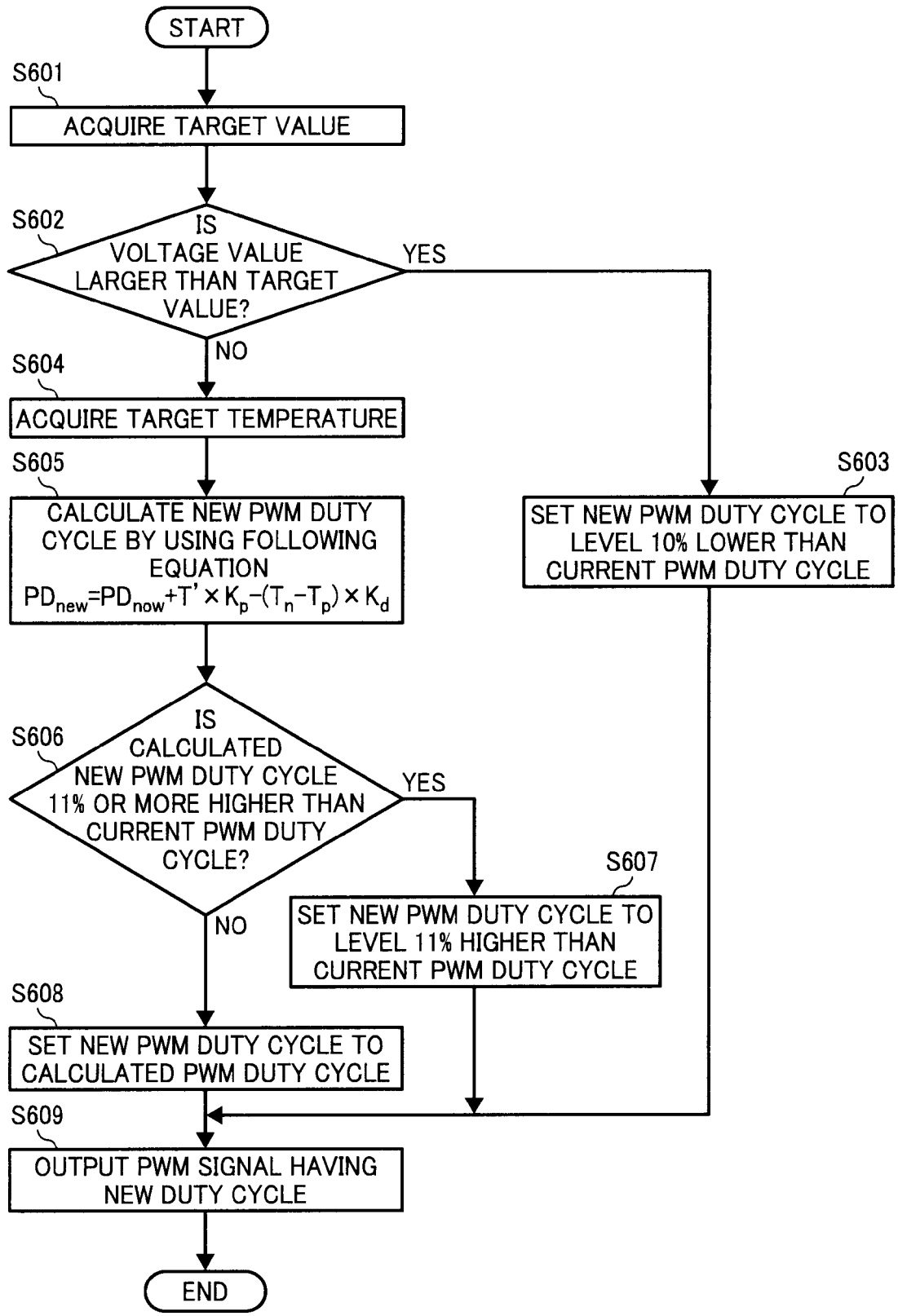
FIG. 7 is a flowchart of a feedback control according to the second embodiment in which the output control device controls the output of the electric power.
Figure 8A:
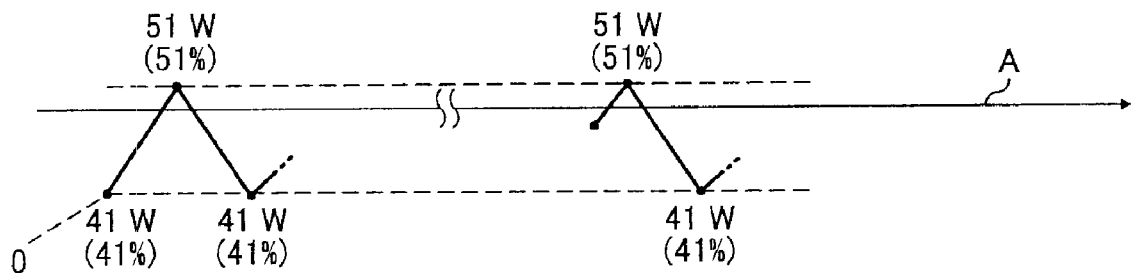
FIG. 8A is a schematic diagram for explaining conventional feedback control of the electric power where the initial value is 41 W.
Figure 8B:
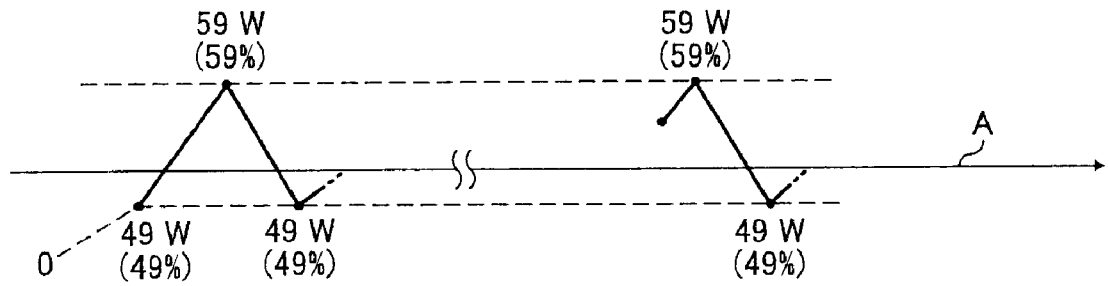
FIG. 8B is a schematic diagram for explaining the conventional feedback control of the electric power where the initial value is 49 W.

A feedback control process performed by the output control device 2000 according to the second embodiment is described with reference to FIG. 7. The feedback control process according to the second embodiment is almost the same as the feedback control process shown in FIG. 5 according to the first embodiment except that the output power is controlled with the temperature taken into consideration. Therefore, the same description, more particularly, the description about Step S601 to Step S603, and Step S608 is omitted.

If the correcting unit 210 determines that the voltage value indicated by the feedback signal is smaller than the target power (No at Step S602), the correcting unit 210 acquires the target temperature from the storage unit 110 (Step S604).

The correcting unit 210 calculates the new PWM duty cycle using Equation (1) that is stored in the storage unit 110 to correct the current PWM duty cycle indicated by the feedback signal that is output from the converting unit 610 (Step S605).

The correcting unit 210 determines whether the PWM duty cycle calculated at Step S605 is equal to or larger than the sum of the current PWM duty cycle and the positive correction amount stored in the storage unit 110 (Step S606).

If the PWM duty cycle calculated at Step S605 is equal to or larger than the sum of the current PWM duty cycle and the positive correction amount (Yes at Step S606), the correcting unit 210 outputs the pulse signal to be converted into the PWM signal having the duty cycle equal to the sum of the current PWM duty cycle and the positive correction amount (Step S607).

If the PWM duty cycle calculated at Step S605 is smaller than the sum of the current PWM duty cycle and the positive correction amount (No at Step S606), the correcting unit 210 outputs the pulse signal to be converted into the PWM signal having the duty cycle calculated at Step S605 (Step S608). After that, the control unit 300 converts the pulse signal received at Step S607 or Step S608 into the PWM signal (Step S609).

In this manner, the feedback control according to the second embodiment using the output power and the temperature of the thermal energy produced by the output power is effective in a case where the level of the electric power cannot exceed the available range. Thus, the output power is subjected to the accurate feedback control within the available range. Moreover, even when the initial value of the electric power output from the power generating unit 400 is variable, the average of the electric power output from the power generating unit 400 is fixed. If the output control device 2000 is used in the MFP, especially, because the output power is controlled with both the temperature and the electric power taken into consideration, the toner image is fixed within a shorter time and the homogeneous image is formed.

Although the output to be controlled is the electric power and the temperature in the above-described embodiments, some other factors, such as brightness and speed, can be controlled, instead. In other words, although the feedback control according to any of the embodiments of the present invention is used in the MFP, it can be used in various devices.

A computer program that is executed by the output control device 1000 or 2000 according to the first embodiment or the second embodiment are provided in a state preinstalled into a recording medium such as a read only memory (ROM). Alternatively, the computer program executed by the output control device 1000 or 2000 can be stored, in a form of a file that is installable and executable on the output control device, in a recording medium readable by the output control device, such as a compact disk-read only memory (CD-ROM), a flexible disk (FD), a compact disk-recordable (CD-R), and a digital versatile disk (DVD).

On the other hand, the computer program can be stored in another computer connected to the output control device via a network such as the Internet, and downloaded to the output control device via the network. The computer program can be delivered or distributed via a network such as the Internet.

The computer program is, for example, made up of modules that implement the units of the output control device, such as the correcting unit, the control unit, and the converting unit, as software. When the CPU (processor) reads the computer program from the recording medium and executes the computer program, the above modules are loaded and created on a main memory thereby implementing the units of the output control device.

Although the output control device according the above-described embodiments is used in the MFP, the output control device can be used in some other devices such as a copier, a facsimile machine, a printer.

According to one aspect of the present invention, in the case of performing a feedback control to adjust a first output amount from a first device to a first target value, a first feedback control in which the first output amount is corrected by a first correction amount for correcting the first output amount when the first output amount is equal to or larger than the first target value and a second feedback control in which the first output amount is corrected by a second correction amount, which is different from the first correction amount, for correcting the first output amount when the first output amount is smaller than the first target value are repeated alternately. Therefore, regardless of the initial value of an output from the first device at the time of starting the feedback control, the average value of the output from the first device can be kept constant.

Furthermore, according to another aspect of the present invention, when an upper limit of a first output amount from a first device is set, a feedback control is repeatedly performed with the first output amount, a second output amount obtained when the first output amount is output, a first correction amount, and a second correction amount that is different from the first correction amount. Therefore, even when the upper limit of the first output amount that can be supplied, the first output amount can be feedback controlled more strictly, and regardless of the initial value of the first output amount from the first device at the time of starting the feedback control, the average value of the output from the first device can be kept constant.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An output control device comprising:
    a storage unit that stores therein a first correction amount and a second correction amount which is different from the first correction amount for correcting a first output amount of a first device;
    a control unit that controls an output of the first device; and
    a correcting unit
        that corrects, when the first output amount is smaller than a first target value, the first output amount based on the first correction amount, and
        that corrects, when the first output amount is equal to or larger than the first target value, the first output amount based on the second correction amount, wherein
    the control unit controls the output of the first device such that the first output amount that is corrected by the correcting unit is output.

2. The output control device according to claim 1, wherein when the first output amount is smaller than the first target value, the correcting unit corrects the first output amount based on a second output amount of a second device that is operated by the first output amount, a second target value of the second output amount, and the first correction amount.

3. The output control device according to claim 2, wherein when the first output amount is smaller than the first target value, the correcting unit calculates a corrected first output amount from the second output amount, the second target value, and the first correction amount, and if the corrected first output amount is equal to or larger than an output correction value that is a sum of the first output amount and the first correction amount, the correcting unit corrects the first output amount to the output correction value, and if the corrected first output amount is smaller than the output correction value, the correcting unit corrects the first output amount to the corrected first output amount.

4. The output control device according to claim 2, wherein the second device is a device for generating a thermal energy.

5. The output control device according to claim 4, wherein the second output amount is a temperature produced by the thermal energy.

6. The output control device according to claim 1, wherein the control unit controls the output of the first device using a pulse-width modulation signal, and the first correction amount and the second correction amount are amounts for correcting a duty cycle of the pulse-width modulation signal.

7. The output control device according to claim 1, wherein the first device is a device for generating an electric power.

8. The output control device according to claim 7, wherein the first output amount is the electric power.

9. The output control device according to claim 7, wherein the device is an electric motor.

10. An image forming apparatus comprising:
a power generating unit that generates an electric power;
a heating unit that heats a heating member of a fixing unit by the electric power from the power generating unit to fix a toner image onto a recording medium;
a storage unit that stores therein a first correction amount and a second correction amount which is different from the first correction amount for correcting the electric power output from the power generating unit;
a control unit that controls an output of the power generating unit;
a correcting unit
that corrects, when the electric power is smaller than a target value, the electric power based on the first correction amount, and
that corrects, when the electric power is equal to or larger than the target value, the electric power based on the second correction amount, wherein
the control unit controls the output of the power generating unit such that the electric power that is corrected by the correcting unit is output.

11. The image forming apparatus according to claim 10, wherein
when the electric power is smaller than the target value, the correcting unit corrects the electric power based on a temperature of the heating member, a target temperature of the heating member, and the first correction amount.

12. The image forming apparatus according to claim 11, wherein
when the electric power is smaller than the target value, the correcting unit calculates a new electric power from the temperature of the heating member, the target temperature, and the first correction amount, and if the new electric power is equal to or larger than an output correction value that is a sum of the electric power and the first correction amount, the correcting unit corrects the electric power to the output correction value, and if the new electric power is smaller than the output correction value, the correcting unit corrects the electric power to the new electric power.

13. The image forming apparatus according to claim 10, wherein
the control unit controls the output of the power generating unit using a pulse-width modulation signal, and
the first correction amount and the second correction amount are amounts for correcting a duty cycle of the pulse-width modulation signal.

14. An output control method for an output control device including a storage unit that stores therein a first correction amount and a second correction amount which is different from the first correction amount for correcting a first output amount of a first device, the output control method comprising:
correcting the first output amount of the first device; and
controlling an output of the first device such that the first output amount that is corrected in the correcting is output, wherein
when the first output amount is smaller than a first target value, the correcting includes correcting the first output amount based on the first correction amount, and
when the first output amount is equal to or larger than the first target value, the correcting includes correcting the first output amount based on the second correction amount.

15. The output control method according to claim 14, wherein
when the first output amount is smaller than the first target value, the correcting includes correcting the first output amount based on a second output amount of a second device that is operated by the first output amount, a second target value of the second output amount, and the first correction amount.

16. The output control method according to claim 15, wherein
when the first output amount is smaller than the first target value, the correcting includes calculating a corrected first output amount from the second output amount, the second target value, and the first correction amount, and
if the corrected first output amount is equal to or larger than an output correction value that is a sum of the first output amount and the first correction amount, the correcting includes correcting the first output amount to the output correction value, and if the corrected first output amount is smaller than the output correction value, the correcting includes correcting the first output amount to the corrected first output amount.

17. The output control device according to claim 15, wherein the second device is a device for generating a thermal energy.

18. The output control device according to claim 14, wherein
the controlling includes controlling the output of the first device using a pulse-width modulation signal, and
the first correction amount and the second correction amount are amounts for correcting a duty cycle of the pulse-width modulation signal.

19. The output control device according to claim 14, wherein the first device is a device for generating an electric power.

* * * * *